United States Patent
Smith et al.

(10) Patent No.: US 12,511,203 B2
(45) Date of Patent: Dec. 30, 2025

(54) SYSTEM AND METHOD FOR VALIDATING EQUIVALENT BEHAVIOR OF REPLACEMENT COMPONENTS OR SUBSYSTEMS IN SOFTWARE-AS-A-SERVICE SYSTEMS

(71) Applicant: Clari Inc., Sunnyvale, CA (US)

(72) Inventors: Patrick Smith, Mountain View, CA (US); Jeffry C. West, San Jose, CA (US); Mamadou Diarra, Broomfield, CO (US); Dylan Keezell, El Cajon, CA (US); Aditya Prabhakar, Fremont, CA (US); Shailesh Patil, Lathrop, CA (US); Xincheng Ma, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 128 days.

(21) Appl. No.: 18/236,570

(22) Filed: Aug. 22, 2023

(65) Prior Publication Data

US 2024/0378122 A1 Nov. 14, 2024

Related U.S. Application Data

(60) Provisional application No. 63/465,944, filed on May 12, 2023.

(51) Int. Cl.
*G06F 11/00* (2006.01)
*G06F 11/16* (2006.01)
*G06F 16/2455* (2019.01)

(52) U.S. Cl.
CPC .... *G06F 11/1658* (2013.01); *G06F 16/24553* (2019.01); *G06F 2201/80* (2013.01)

(58) Field of Classification Search
CPC ............ G06F 11/1658; G06F 11/3688; G06F 11/3692; G06F 16/24553
See application file for complete search history.

(56) References Cited

U.S. PATENT DOCUMENTS

| | | | |
|---|---|---|---|
| 6,519,730 B1 * | 2/2003 | Ando | G06F 11/1641 |
| | | | 714/E11.063 |
| 10,031,810 B2 * | 7/2018 | Berger | G06F 11/1435 |
| 10,514,890 B2 * | 12/2019 | Mody | G06F 7/76 |
| 11,943,344 B2 * | 3/2024 | Barrameda | H04L 9/0643 |

(Continued)

*Primary Examiner* — Elmira Mehrmanesh
(74) *Attorney, Agent, or Firm* — WOMBLE BOND DICKINSON (US) LLP

(57) ABSTRACT

A system to validate behavior of a replacement component is disclosed. The system obtains first result data, the first result data being generated by performing a first request at a first component of a production environment. The system performs second request at a second component of the production environment to generate second result data. The system performs a parity check between the first result data and the second result data to determine an equivalence in behavior between the first request at the first component and the second request at the second component. The system generates discrepancy information indicating the equivalence in behavior between the first request at the first component and the second request at the second component based on the parity check. The system performs a third action based on the discrepancy information including storing the discrepancy information.

20 Claims, 11 Drawing Sheets

(56) References Cited

U.S. PATENT DOCUMENTS

2016/0098469 A1* 4/2016 Allinson ............. H04L 67/1095
                                                          707/610
2020/0311295 A1* 10/2020 Fox ........................... G06F 8/73
2021/0165731 A1* 6/2021 Ross ...................... G06F 21/577
2021/0311930 A1* 10/2021 Vishwakarma ..... G06F 16/2379

* cited by examiner

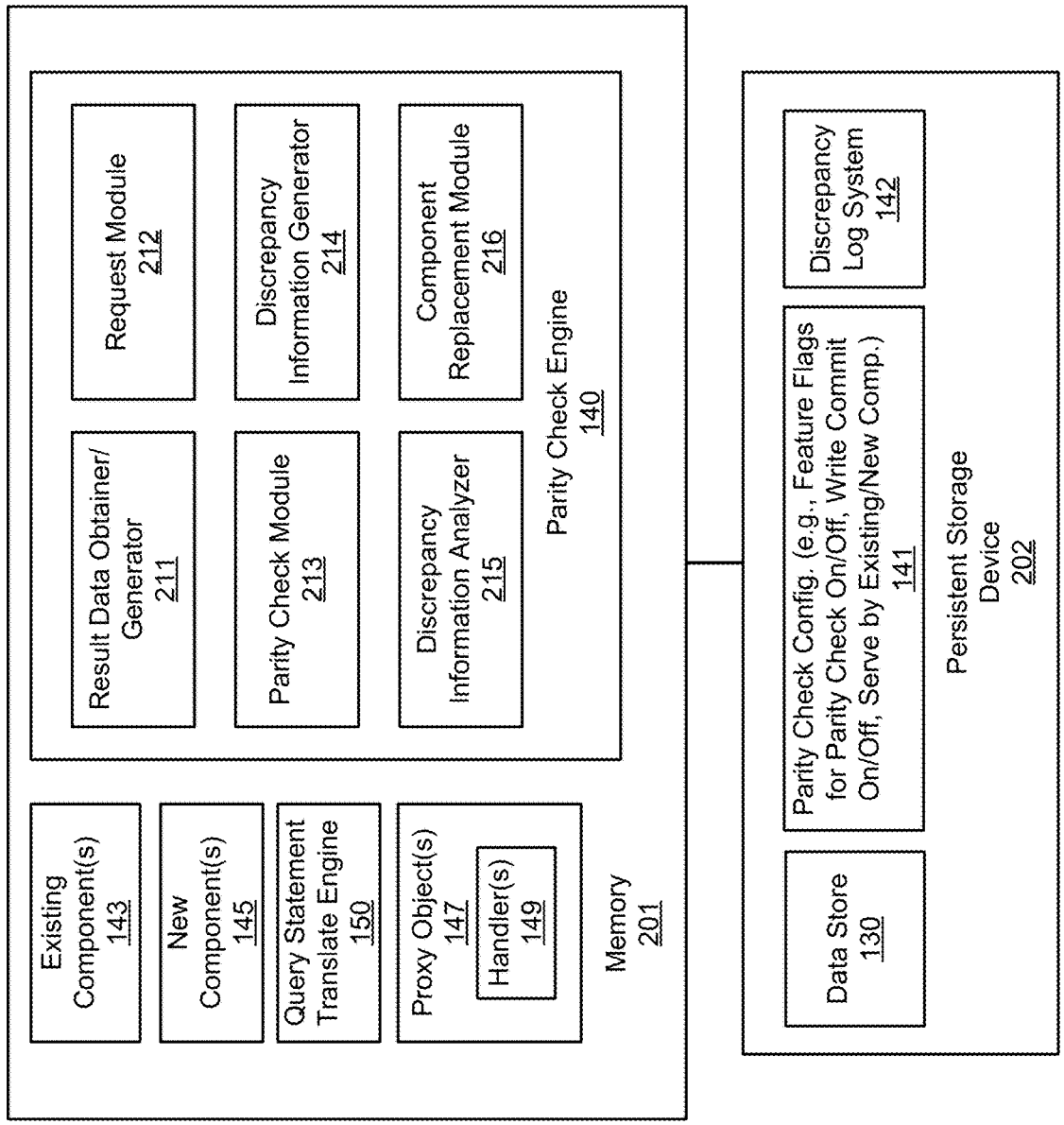

```
{
    "query_time": "2023-01-18 00:59:59",
    "query_id": "001",
    "listA": {
        "listA1": [
            {
                "key": "key1",
                "value": "value1"
            },
            {
                "key": "key2",
                "value": "value2"
            }
        ],
        "listB": [
            {
                "key": "key3",
                "value": "value3"
            },
            {
                "key": "key4",
                "value": "value4"
            }
        ]
    }
}
```

```
{
    "query_time": "2023-01-18 01:01:59",
    "query_id": "002",
    "listA": {
        "listA1": [
            {
                "key": "key2",
                "value": "value2"
            },
            {
                "key": "key1",
                "value": "value1"
            }
        ],
        "listB": [
            {
                "key": "key3",
                "value": "value5"
            }
        ]
    }
}
```

SYSTEM AND METHOD FOR VALIDATING EQUIVALENT BEHAVIOR OF REPLACEMENT COMPONENTS OR SUBSYSTEMS IN SOFTWARE-AS-A-SERVICE SYSTEMS

CROSS-REFERENCE TO RELATED APPLICATIONS

This application claims the benefit of priority to U.S. provisional application 63/465,944, filed on May 12, 2023. The disclosures of the aforementioned patent application is hereby incorporated by reference in its entirety.

FIELD OF THE INVENTION

Embodiments of the present invention relate generally to data processing by a data processing system. More particularly, embodiments of the invention relate to system and method for validating equivalent behavior of replacement components or subsystems in software-as-a-service (SaaS) systems.

BACKGROUND

In software-as-a-service (SaaS) systems, there is often a need to replace logic or components to improve performance, add functionalities, substitute functionalities, etc. For existing upgrades, the behavior of a component before and after the change is expected to remain the same.

Currently, a replacement component typically relies on quality assurance (QA) testing to ensure that a prior behavior of the component is preserved. However, modern enterprise SaaS products allow customers (e.g., tenants) to customize the SaaS components to meet their enterprise needs. In practice, it becomes impractical to validate all permutations of configuration, data, and inputs in a test environment of the SaaS systems for each of the customers. The volume of data and combinations of customizations are difficult to capture, which can result in gaps in testing. The gaps can lead to unexpected changes in behavior of the SaaS systems leading to a negative user experience for the customers.

BRIEF DESCRIPTION OF THE DRAWINGS

Embodiments of the invention are illustrated by way of example and not limited to the figures of the accompanying drawings in which like references indicate similar elements.

FIG. 2 is a block diagram illustrating an example of a data analytics system according to one embodiment.

FIGS. 5A-5B illustrate examples of JavaScript Object Notation (JSON) responses according to some embodiments.

DETAILED DESCRIPTION

Figure 1A:
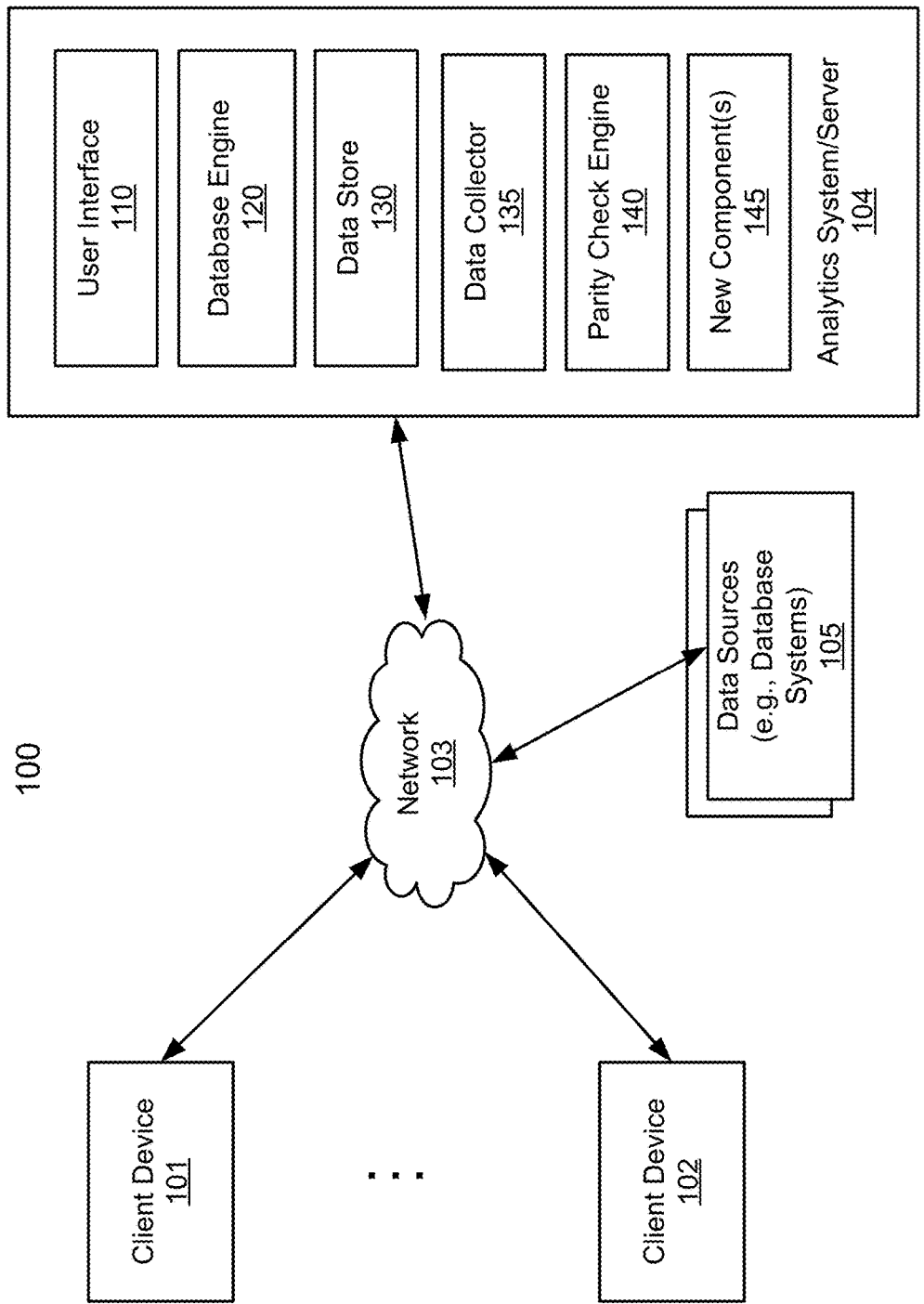
FIGS. 1A and 1B are block diagrams illustrating a SaaS system in a production environment according to certain embodiments.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, described herein are systems and methods that rely on a live production environment instead of Quality Assurance techniques to validate replacement components against existing SaaS components without duplicating a separate copy of the SaaS system and without negatively impacting live customers of the SaaS system.

When a new implementation of a SaaS component is developed and the new component is intended to replace an existing component of a SaaS system, it is desirable to validate the new component to have the same behaviors as the existing component for all configurations and data patterns used in a production environment in order to ensure that there is minimal impact to the users when the new component is activated in the live production environment.

Currently, the primary mechanism to verify that a new component matches the behavior of the existing component is to capture as many combinations of configurations, inputs, and stimuli as possible in tests, and to verify by quality assurance tests that no behavior is inadvertently changed. However, due to the sheer number of permutations of customers' customizations, configurations, inputs, and stimuli, a full coverage of the system is extremely difficult to achieve and few organizations are able to successfully achieve and maintain such a full coverage in the long term.

An existing approach is a produce a duplicate environment that has a copy of the SaaS system having a copy of the customer's data and a copy of the same components. The new component is then introduced to the duplicate environment. Thereafter, input streams from the production system are replicated on the duplicate environment and outputs from the duplicate environment and the production environment are compared for differences. But the costs to duplicate the SaaS system might be prohibitive.

According to one embodiment, a live production environment is used to validate a new component. A system obtains first result data, the first result data being generated by performing a first request at a first component of a production environment. The system performs second request at a second component of the production environment to generate second result data. The system performs a parity check between the first result data and the second result data to determine an equivalence in behavior between the first request at the first component and the second request at the second component. The system generates discrepancy information indicating the equivalence in behavior between the first request at the first component and the second request at the second component based on the parity check. The system performs a third action based on the discrepancy information including storing the discrepancy information. Here, validation on the production environment can capture the sheer number of combinations of configuration, data, hierarchy, etc. and can capture a majority of frequented customer use cases. This validation technique further eliminates the need for, and cost of, a separate test environment and eliminates having to maintain separate test cases for the separate environment. The validation results in a higher degree of confidence in the correctness of behavior of a new replacement component at a significant lower cost.

FIG. 1A is a block diagram illustrating a SaaS system in a production environment according to one embodiment of the invention. Referring to FIG. 1A, system 100 includes, but is not limited to, one or more client systems 101-102 communicatively coupled to server 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Server 104 can be any kinds of servers or a cluster of servers, such as, for example, web servers, application servers, cloud servers, backend servers, etc.

In one embodiment, server 104, which may be a cloud server, provides data analytics services to clients 101-102 based on data provided by database systems as a data source 105. Note that multiple database systems may be implemented, where data analytics system 104 may be implemented as a multi-tenancy system that can access multiple database systems concurrently. For example, a user of client device 101 may be associated with a first entity or organization as a first corporate client to data analytics system 104, while a user of client device 102 may be associated with a second entity or organization as a second corporate client to data analytics system 104. The first and second entities may employ different database systems, each of which maintains a database or data structure storing data for the entities. Also note that a database system is utilized as an example of data sources 105, however, other types of data sources or systems can also be used.

In one embodiment, data analytics system 104 includes, but it is not limited to, user interface 110, database engine 120 (also referred to as database manager, which may be part of database management software), data store 130, data collector 135, and parity check engine 140. User interface 110 can be any kind of user interface (e.g., Web, graphical user interface or GUI, or command line interface or CLI) that allows users of client devices 101-102 to access data analytics services provided by data analytics system 104, such as, for example, forecasts, trend analysis, or pulse analysis services to be performed for various time periods for some underlying data. The underlying data can include tasks, projects, products, or any type of customer relations data. For example, via user interface 110, a user can request a trend snapshot/analysis for a set of tasks of a specific time period by specifying one or more attributes (database fields) associated with the tasks. Each of tasks can be associated with an entity (company or project or database table). Attributes can represent columns of a database table. Each entity can include numerous objects/records with at least attributes corresponding to an identifier attribute (to identify the object/record) and a modification date attribute (a time when the object/record is modified).

In response to a request received via user interface 110 from a client, such as clients 101-102, database engine 120 determines a period of time (e.g., a query time period) based on the request that the user is interested in. The query time period can be a current quarter, week, day, or year. Database engine 120 further determines a set of one or more attributes, which may be received from a user via user interface 110. Database engine 120 retrieves task data associated with the time period and the one or more attributes from data store 130.

Data store 130 stores or caches a variety of time-series data, such as projects, tasks, and product facts. Time-series data are data collected at different points in time. Data collector 135 can be configured to periodically collect or update data from data sources 105 to store in data store 130. For example, data collector 135 can be periodically updated from corresponding data source(s) or data provider(s) 105, for example, via a periodically executed thread (which may be running as a subroutine or as a background job as a part of a housekeeping routine or thread) over a network (e.g., Internet). Alternatively, database engine 120 may dynamically access a task database system to query and retrieve task data using a variety of database accessing protocols associated with the task database system, such as an SQL protocol. Data stored in data store 130 can be maintained in a variety of data structures, such as one or more tables contained within one or more databases. Database engine 120 can access data store 130 via a variety of application programming interfaces (APIs), database queries, or other suitable communication protocols.

Database engine 120 can perform data retrieval for one or more past time periods. Database engine 120 can retrieve data associated to determined past time periods from data store 130 or data source 105, where the retrieved data is for the customer entity. Database engine 120 can retrieve data for one or more time points for trend or pulse analysis for one or more customer entities.

In one embodiment, when new component(s) are implemented to replace existing components (e.g., any of user interface 110, database engine 120, data store 130, and data collector 135) or subsystems/subcomponent/submodules of the existing components, parity check engine 140 can validate the new component(s) without affecting the functionalities of the existing components and without affecting a user experience for the customers. For example, parity check engine 140 can validate the new component(s), in the production environment, to ensure the new component(s) have the equivalent behavior as that of the existing components before the new component(s) are switched over live in the production environment.

Figure 1B:
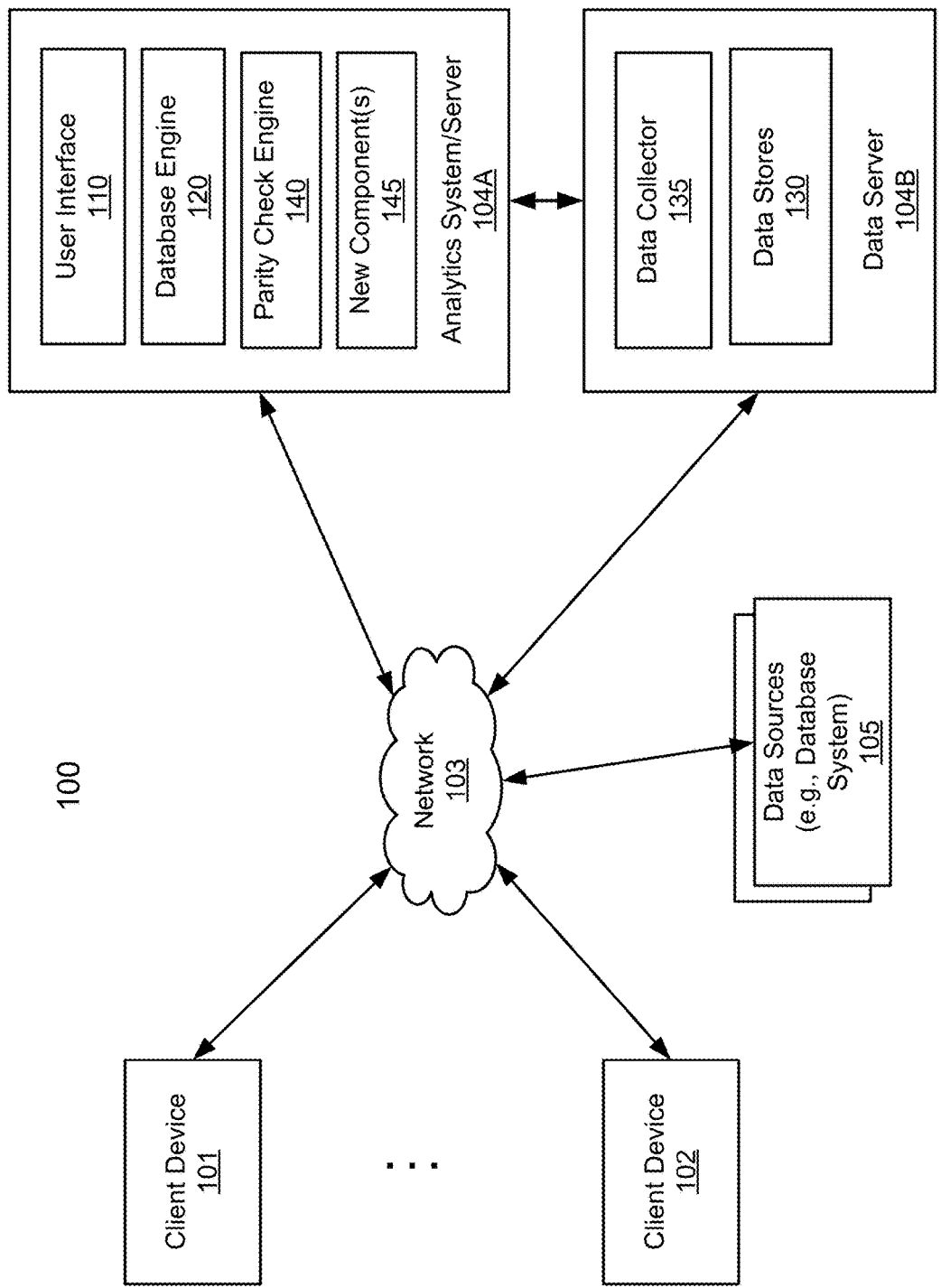

In some embodiments, data store 130 is maintained in a dedicated data server that is a separate server from data analytics server 104 as shown in FIG. 1B. Referring to FIG. 1B, in some embodiments, data analytics server 104A and data server 104B are implemented as separate servers. Data store 130 can be maintained by data server 104B. Data server 104B can further include data collector 135 configured to periodically or constantly collect or update task data from data sources 105. Data analytics server 104A can communicate with data server 104B using a variety of communication protocols to access task data stored in data store 130.

FIG. 2 is a block diagram illustrating an example of a data analytics system 104 according to one embodiment of the invention. System 104 may be implemented as part of data analytics system 104A or server 104B. Referring to FIG. 2, system 104 includes existing component(s) 143, new component(s) 145, proxy object(s) 147, handler(s) 149, query statement translate engine 150, and parity check engine 140 loaded in memory 201 and executed by one or more processors (not shown). Data store 130 and parity check configuration data (e.g., Parity Check On/Off, Served Component Existing/New, and Write Commit On/Off Feature Flags, granularity, and sampling rate, etc.) 141 can be stored in persistent storage device 202, such as a hard disk, which may be maintained locally or remotely over a network. A portion of the data stored in data store 130 and/or configuration data 141 can be cached in memory 201.

Existing components 143 can represent any of user interface 110, database engine 120, data collector 135 of FIG. 1A, or any subsystem/subcomponent/submodules thereof. New component(s) 145 can represent a new implementation replacements for any of the existing components. Proxy object(s) 147 can be an intermediary between the client request and the existing/new components. Handler(s) 149 can be used to intercept requests for the corresponding proxy object(s) 147. Query statement translate engine 150 can translate a query statement from one database scheme to another database scheme. Parity check engine 140 can perform a parity check between two components. In one embodiment, parity check engine 140 includes modules: result data obtainer/generator 211, request module 212, parity check module 213, discrepancy information generator 214, discrepancy information analyzer 215, and component replacer 216.

Result data obtainer/generator 211 can obtain/generate results data corresponding to a request. For example, module 211 can retrieve, from a memory address location, the results data for a request or can generate a response data representing the results data for the request.

Request module 212 can perform a request. The request can be an access request or a write request to a data source (e.g., 105 or 130 of FIG. 1A). In some embodiments, the request can be an API request to an API server, or a http request (e.g., get, post, put, patch, or delete) to a http server over the Internet.

Parity check module 213 can perform a parity check for a new (e.g., replacement) component. Discrepancy information generator 214 can generate discrepancy information for a parity check. Discrepancy information analyzer 215 can analyze the discrepancy information to detect any behavior changes in the replacement component. Component replacement module 216 can switch the serving of a client from an existing component to a replacement component, and vice versa. Some or all of modules 211-216 may be implemented in software, hardware, or a combination thereof. Some of modules 211-216 can be integrated together as an integrated module.

Figure 3A:
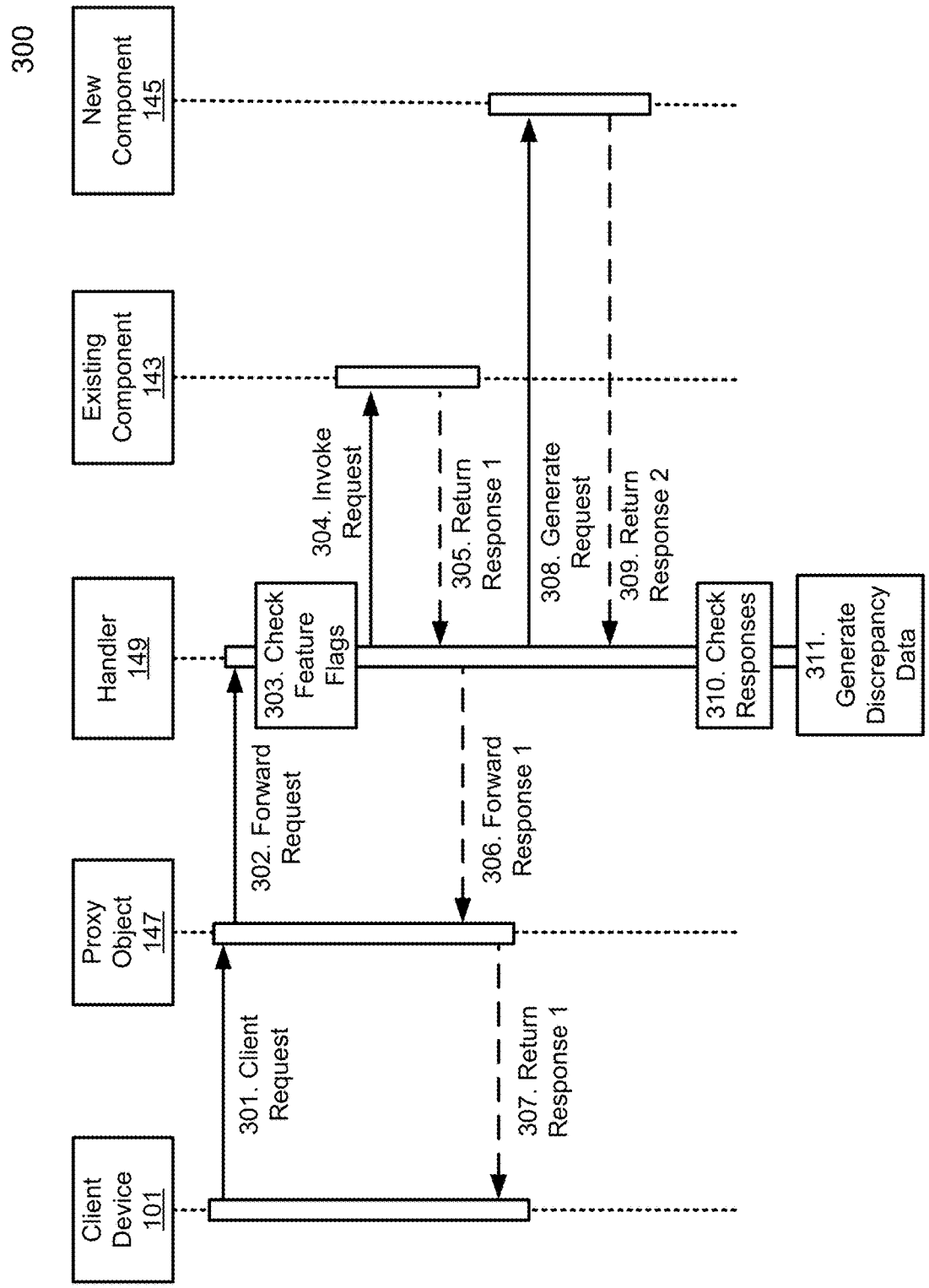
FIG. 3A illustrates a block diagram of a parity check process for an access request according to one embodiment.

FIG. 3A illustrates a block diagram of a parity check process 300 for an access request according to one embodiment. Process 300 can correspond to the validation for a client request for new component 140. New component 140 can implement some replacement feature(s) for any of existing components 143 (e.g., any of components 110-135 of system 104 of FIG. 1A). The replacement feature(s) can be a subcomponent, subsystem, or some portions of any of the existing components or combinations thereof. Process 300 may be performed by processing logic which may include software, hardware, or a combination thereof. For example, process 300 may be performed by parity check engine 140 or system 104 of FIG. 1A.

As shown in FIG. 3A, in one embodiment, at block 301, a proxy object receives a client request from a client device (e.g., client device 101). The client request can represent an access request to retrieve data from local or remote data storage, database, or the like. A proxy object is a wrapper or agent object that is being called by the client to act as an intermediary in accessing an underlying object. In one embodiment, the proxy object can be a dynamic proxy that wraps around an existing component object allowing injection of code before and/or after execution of the component object. For example, the proxy object, the existing and the new components can implement a same interface. When the client calls or invokes a request, the proxy object acts as the intermediary and passes the client request to the underlying object (e.g., the existing and/or the new component).

At block 302, processing logic forwards the client request to handler 149. Handler 149 can intercept the client request and modify the behavior for the client request.

In one embodiment, handler 149 includes an invocation handler used to intercept the client request and to add the additional behavior for the underlying component according to some configuration data 141. An invocation handler (InvocationHandler) is a special interface that allows intercepts of a method call to the underlying component so to add the additional behaviors to the underlying component.

At block 303, processing logic checks the configuration feature flags for the parity check engine (e.g., configuration data 141 of FIG. 2) to determine if 1) a parity check procedure is to be performed, 2) whether the request is served by the existing component or the new component, and/or 3) for write requests, whether to commit the write request to the serving component. In some embodiments, the configuration data can further include granularity of the log data denoting how many sub-levels of the JSON responses are compared and logged, such as record level metadata, result level metadata, etc. The configuration data can further include a sampling rate denoting how often (e.g., 1%, 5%, 50%) are the query requests checked for discrepancies, where the metadata for the parity discrepancies are stored in the log system 142. The configurable granularity and sampling rate settings can fine-tune the analysis of the customer transactions on the SaaS system for discrepancies while not overwhelming the log system. Handler 149 can intercept the client request and handle the client request according to the configuration data.

At block 304, in one embodiment, if 1) parity check is enabled, 2) request is served by existing component, and 3) the request is an access request, handler 149 invokes the request at existing component 143. For example, a client may have requested the SaaS system to return some query results from a data source, where the data source is a remote database, such as 105 of FIG. 1A, service by existing component 143. The new component may be implemented where a same data is served by data store 130 instead of data source 105.

At block 305, the existing component serves the client request and returns a response that has the requested result data (e.g., response 1) to handler 149. At block 306, handler 149 forwards the results data to proxy 147. At block 307, proxy 147 forwards the results data to client device 101.

At block 308, when the parity check is enabled (e.g., indicated by Parity Check On/Off Feature Flag), handler 149 spawns a new background thread to asynchronously submit a equivalent request to new component 145. At block 309, new component 145 returns results data (e.g., response 2) to handler 149. The results data (responses 1 and 2) can be binary objects, Javascript Object Notation (JSON) objects, XML, or data in other formats.

At block 310, processing logic performs a parity check using the results data from the existing component, e.g., response 1, and the results data from the new component, e.g., response 2. The results data comparison can compare the data for behavior discrepancies for components 143 and 145. Some behavior discrepancies can include: mismatches in record count, mismatches in the number of fields, mismatches in field parameters, a discrepancy in query latencies (e.g., latency above a predetermined threshold). For example, referring to the JSON objects in FIGS. 5A-5B, object 500 of FIG. 5A can represent a query response at an existing component. Object 510 in FIG. 5B can represent a query response at a new component. As shown in FIGS. 5A-5B, comparing the two responses, the count of key-value pairs for list B is 2 in response object 500 and the count of key-value pairs for list B is 1 in response object 510. Here, (key4, value4) is missing from response object 510. Such mismatch in the number of fields indicates a behavior discrepancy and is appended to the discrepancy data. In another example, the value field for key-value pair having key3 is value3 for object 500 and the value field is value5 for object 510. The mismatch in the field parameters indicates additional behavior discrepancy between the existing and new components. Such discrepancies are appended to the discrepancy log system 142.

In some embodiments, some discrepancies are ignored. In one embodiment, the ordering of lists in the JSON results can be ignored, where the different orderings do not indicate changes in behavior. For example, referring to objects 500-510 in FIGS. 5A-5B, comparing the two responses, the key-value pairs (key1, value1) and (key2, value2) have different orderings. Given that the orderings of listA1 does not matter, the discrepancy in the ordering for pairs (key1, value1) and (key2, value2) can be ignored.

In another embodiment, the query timestamp and/or the query identifier (ID) in the results data can be ignored, where the query timestamp representing when a query is performed. For example, the query time and ID for object 500 is "2023-01-18 00:59:59" and "001", and the query time and ID for object 510 is "2023-01-18 01:01:59" and "002". These mismatches can be ignored since they do not affect a behavior of the components.

At block 311, processing logic generates the discrepancies as log data, where the discrepancies can be stored as part of log system 142 of FIG. 2 and the logs can be further analyzed by an operator and/or processing logic. In one embodiment, the types of/counts of discrepancies is suppressed to one occurrence per session using heuristics to remove repetitions of a same type of discrepancies in the log data. Here, data comparisons occur in a live production environment using authentic user-generated data and user interactions, without disrupting the users, thereby the parity check engine can test for performance and behavior changes in a realistic environment. Further, user interactions for customers on the SaaS system can be checked for behavior equivalence by the parity check engine.

Figure 3B:
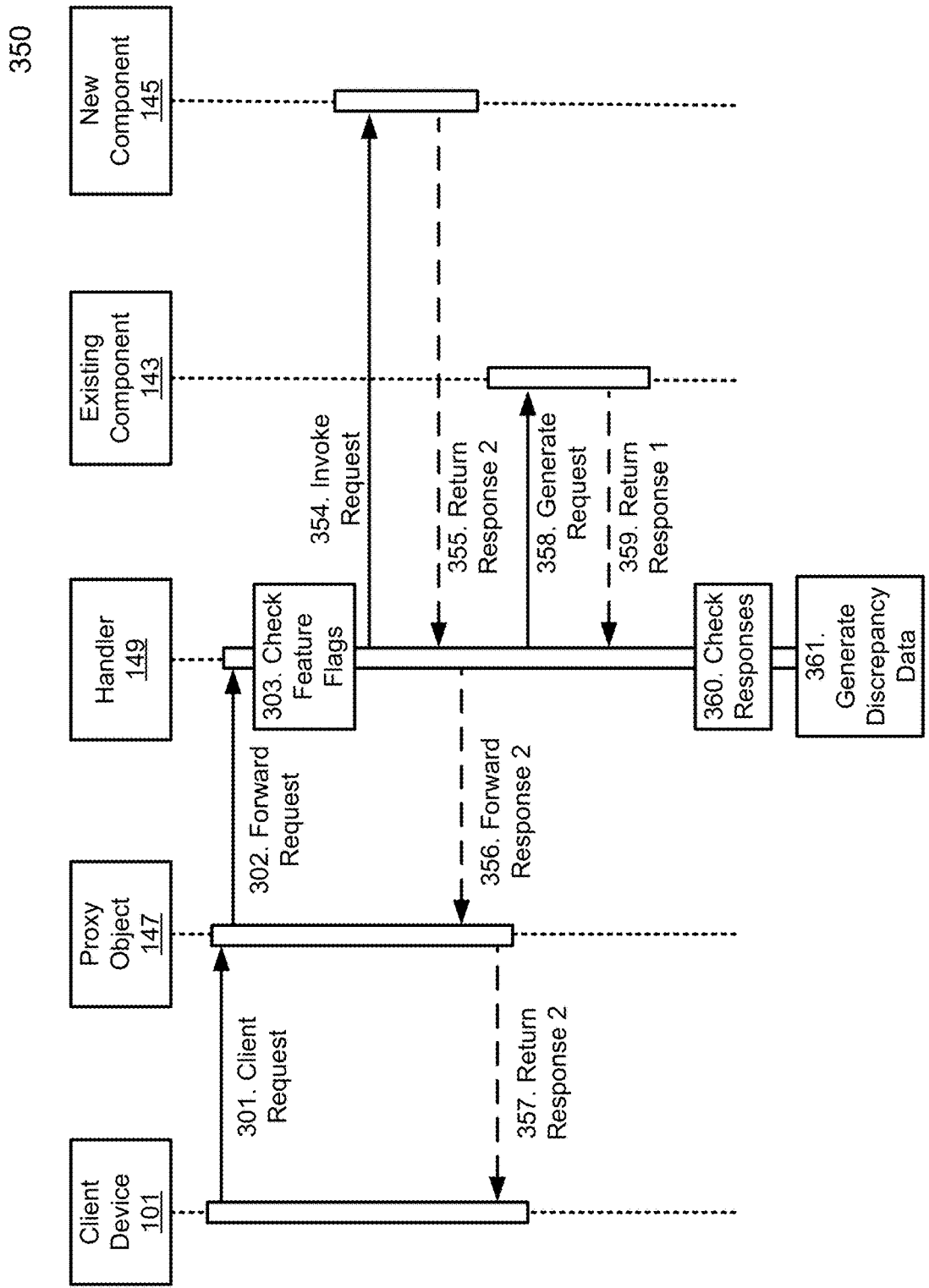
FIG. 3B illustrates a block diagram of a parity check process for an access request according to another embodiment.

FIG. 3B illustrates a block diagram of a parity check process 350 for an access request according to another embodiment. Process 350 can represent process 300 of FIG. 3A except that the client request is switched over to be served by new component 145 and the disparity check is for new component 145 against existing component 143.

As shown in FIG. 3B, in one embodiment, at block 301, processing logic checks the configuration data for feature flags (e.g., configuration data 141 of FIG. 2) to determine if 1) a parity check procedure is to be performed, 2) whether the request is served by the existing component or the new component, and 3) whether to commit write requests to the serving component.

At block 354, in one embodiment, if 1) parity check is enabled, 2) the request is served by new component, and 3) the request is an access request, handler 149 invokes the request for new component 145. For example, when a client submits a client access request, the SaaS system retrieves data from data store 130 instead of data source 105, where new component is implementing data retrieval from data store 130.

At block 355, the new component serving the client request returns a response (e.g., response 2) to handler 149. At block 356, handler 149 forwards the response to proxy 147. At block 357, proxy 147 forwards the response to client device 101.

At block 358, when the parity check is enabled (e.g., indicated by Parity Check On/Off Feature Flag), handler 149 spawn a new processing thread to asynchronously submit a same request to existing component 143. At block 359, existing component 143 returns results data (e.g., response 1) to handler 149.

At block 360, processing logic performs a parity check using the results data of the new component, e.g., response 2, against the results data of the existing component, e.g., response 1. The results data comparison can compare the data from behavior discrepancies between components 145 and 143. As previously described, some behavior discrepancies can include: mismatch in record count, mismatches in the number of fields returned, mismatch field parameters, a discrepancy in query latencies (e.g., latency above a predetermined threshold). In some embodiments, some discrepancies are ignored. For example, for JSON objects, the ordering of lists in the JSON results may be ignored, when the ordering does not matter. For another example, the query time and query ID for components 143 and 145 are expected to be different and are ignored.

At block 361, processing logic generates the discrepancies as log data, where the discrepancies can be stored and analyzed by an operator and/or processing logic. In one embodiment, the types of/counts of discrepancies is suppressed to one occurrence per session using heuristics to remove repetitions of a same type of discrepancies in the log data. Different from process 300, process 350 serves the client using new component 145.

Figure 3C:
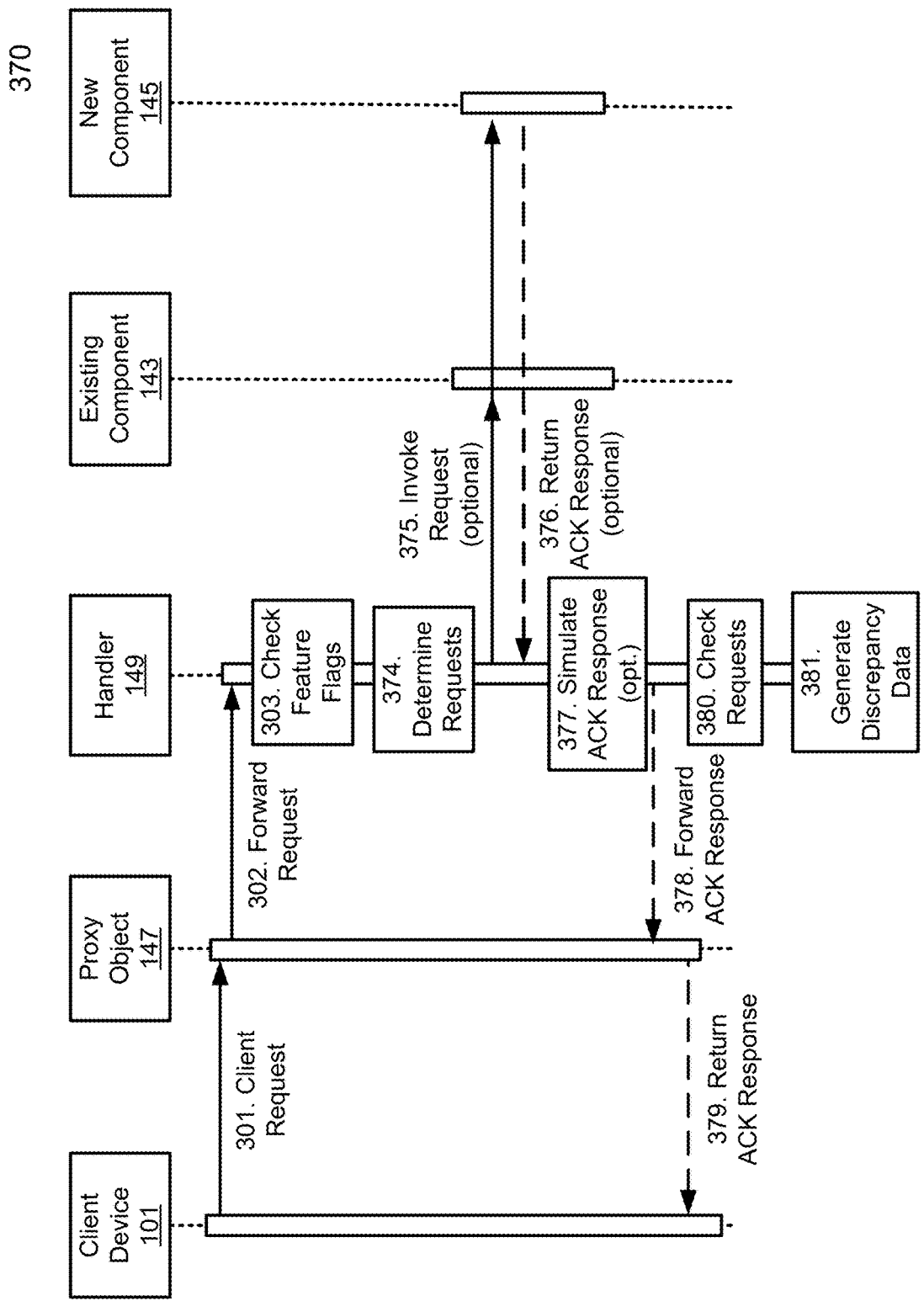
FIG. 3C illustrates a block diagram of a parity check process for a write request according to one embodiment.

FIG. 3C illustrates a block diagram of a parity check process 370 for a write request according to one embodiment. Process 370 can represent process 300 of FIG. 3A except that the client request is a write request.

As shown in FIG. 3C, in one embodiment, at block 303, when the client request is forwarded to handler 149, processing logic checks the configuration data for feature flags (e.g., configuration data 141 of FIG. 2) to determine if 1) a parity check procedure is to be performed, 2) whether the request is served by the existing component or the new component, and 3) for write requests, whether to commit the write request to the serving component.

At block 374, processing logic determines that statements for the write requests to components 143-145. For example, the statement for the write request to existing component 143 can differ from the statement for the write request to new component 145 when the components 143-145 are different types of databases or data stores, e.g., NoSQL versus MySQL. Processing logic can determine an equivalent query statement to the components 143-145 using a query statement translate engine.

At block 375, in one embodiment, if processing logic determines that write commit is enabled, and 3) the write request is to be committed to either the existing or new component, handler 149 invokes the request at either existing component 143 or new component 145.

At block 376, the component serving the client request returns a write request acknowledgement (ACK) response to handler 149. At block 378, handler 149 forwards the ACK to proxy 147. At block 379, proxy 147 forwards the ACK to client device 101.

In one embodiment, at block 377, if the write commit feature flag is turned off, processing logic generates a simulated ACK response.

At block 380, processing logic performs a parity check on the statements of the two write query requests from block 374. I.e., the parity checked compares the write instructions to ensure that both system are committing the same update to the data stores without having to perform any write operations at the data stores if the write commit feature flag is turned off. In other words, the parity check can preview the write operations for both components and compares the write operations to verify that they are the same. In some embodiments, only a single write operation is committed at either data store (controlled by feature flag) thereby avoiding problems associated with multiple writes. In some embodiments, a write request statement to existing component is translated to a scheme compatible with the new component, or a write request statement to a new component is translated to a scheme compatible with the existing component to generate the statements for the two write requests.

At block 381, processing logic generates discrepancy data for the comparisons of the two write request statements. The discrepancy data is stored on the server, such as server 104 of FIG. 1A for analysis.

Although FIGS. 3A-3C show query requests, the client request can include API requests and/or HTTP requests, where the existing component can represent a URL address and the new component can represent another URL address that intends to replace the first URL address.

Figure 4:
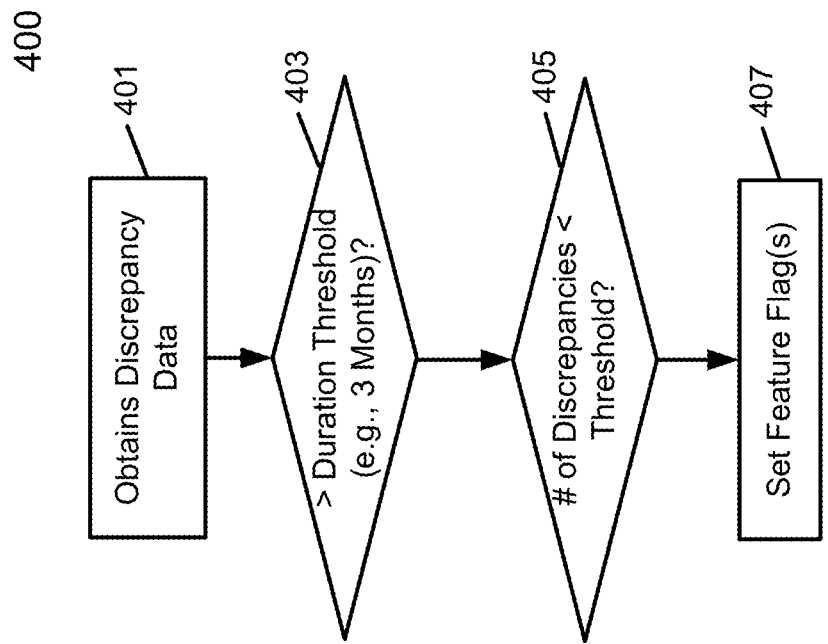
FIG. 4 illustrates an example to automate the replacement of existing components for a production environment according to one embodiment.

FIG. 4 illustrates an example to automate the replacement of existing components for a production environment according to one embodiment. Process 400 can automate the validation process for a SaaS system having one or more replacement component(s). Process 400 may be performed by processing logic which may include software, hardware, or a combination thereof. For example, process 400 may be performed by parity check engine 140 or system 104 of FIG. 1A.

Referring to FIG. 4, at block 401, processing logic obtains discrepancy data, such as data from discrepancy log system 142 of FIG. 1A. Discrepancy data can include behavior differences for two components. The behavior differences can include differences in the responses generated by the two components and a discrepancy in the request latency being greater than a threshold. For write requests, the behavior differences can include differences in the write request statements for the two components once the write requests statements are translated to a same database scheme.

At block 403, processing logic determines if the discrepancy data spans a time duration greater than a predetermined threshold, e.g., 3 months.

At block 405, processing logic determines if the number of discrepancies is less than a predetermined threshold, e.g., 10.

At block 407, processing logic modifies one or more feature flags to advance the component(s) validation according to the conditional results of blocks 403-405. For example, if condition of block 403 is true, processing logic sets the client request to be service by a new replacement instead of the existing component. In another example, if conditions of blocks 403-405 are true, processing logic further sets the parity check flag for a current component to be false. In some embodiments, processing logic can determine and set the feature flags for a next replacement component for parity check, and so forth. In some embodiments, multiple component(s) are queued to be validated by parity check and one component is validated for a customer at a time. In some embodiments, multiple component(s) for multiple customers on the SaaS system are validated by parity check at a same time and conditional results of blocks 403-405 controls the features flags for each component for parity check. Here, the parity checker can be implemented within an existing production environment so that comparisons can be performed in real-time for the live SaaS system.

Figure 6:
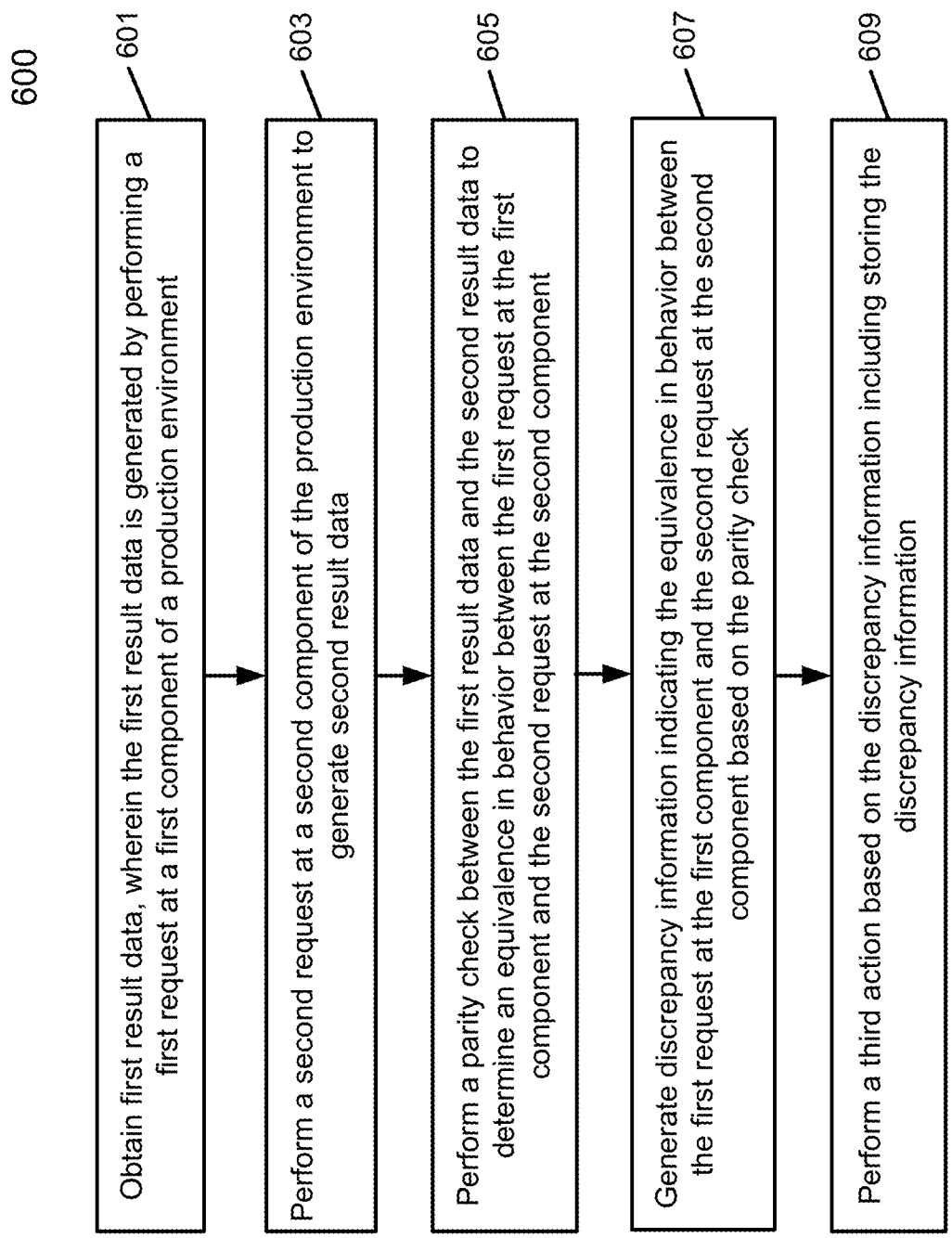
FIG. 6 is a flow diagram illustrating a process to validate a replacement component in a production environment according to one embodiment.

FIG. 6 is a flow diagram illustrating a process 600 to validate a replacement component in a production environment according to one embodiment. Process 600 may be performed by processing logic which may include software, hardware, or a combination thereof. For example, process 600 may be performed by parity check engine 140 of FIGS. 1A-1B.

At block 601, processing logic obtains first result data, wherein the first result data is generated by performing a first request at a first component of a production environment.

At block 603, processing logic performs a second request at a second component of the production environment to generate second result data.

At block 605, processing logic performs a parity check between the first result data and the second result data to determine an equivalence in behavior between the first request at the first component and the second request at the second component.

At block 607, processing logic generates discrepancy information indicating the equivalence in behavior between the first request at the first component and the second request at the second component based on the parity check.

At block 609, processing logic performs a third action based on the discrepancy information including storing the discrepancy information.

In one embodiment, before obtaining the first result data, processing logic determines a first configuration indicator (e.g., Parity Check On/Off feature flag) indicating whether to perform the parity check when a client requests performance of the first request at the production environment.

In one embodiment, performing the first request at the first component includes performing a first access query request at a first data store and performing the second request at the second component comprises performing a second access query request at a second data store, wherein the first and second result data are a first and a second query result.

In one embodiment, processing logic further determines a second configuration indicator (e.g., Served by Existing or New Component Feature Flag) indicating either to access data from the first or second data store, and in response to determining that the second configuration indicator indicating to access data from the second data store, processing logic returns the second result data to a client.

In one embodiment, performing the first request at the first component includes performing a first write query request to mutate data at a first data store, and performing the second request at the second component includes performing a second write query request to mutate data at a second data store.

In one embodiment, processing logic further intercepts the first or the second write query requests, translates the first write query request to correspond to a second schema, wherein the first data store is of a first schema and the second data store is of the second schema, and performs the parity check between the translated first write query request and the second write query request to generate the discrepancy information indicating discrepancies between the translated first write query request and the second write query request.

In one embodiment, processing logic further determines a second configuration indicator indicating either to commit the first write query request to the first data store or to commit the second write query request to the second data store, and in response to determining that the second configuration indicator indicating the second write query request is to be committed to the second data store, commits the second write query request to the second data store.

In one embodiment, processing logic further determines a third configuration indicator (e.g., Write Commit On/Off Feature Flag) indicating whether to commit writes to the production environment, and in response to determining that the third configuration indicator indicating not to commit writes to the production environment, refrains from committing the second write query request to the second data store.

In one embodiment, performing the first request at the first component includes performing a first http request at a first http address and performing the second request at the second component comprises performing a second http request at a second http address, where the first and second result data include http response data.

In one embodiment, processing logic further determines the discrepancy information satisfies a predetermined criteria, and returns the second result data that is generated by the second request to a client, wherein the client requested the first request.

In one embodiment, processing logic further determines that the discrepancy information satisfy a predetermined criteria and replaces the first component by the second component including returning the second result data that is generated by the second request to a client, or determines that the discrepancy information does not satisfy the predetermined criteria and postpones a replacement time of the first component by the second component.

In one embodiment, the equivalence in behavior includes itemized content of the first result data matching itemized content of the second result data.

In one embodiment, the first or second result data includes one or more itemized content and timestamps reflecting execution times of the first or second requests, wherein the parity check ignores an ordering of the itemized content and ignores the timestamps.

In one embodiment, the discrepancy information includes parity metadata for the first and second result data and the parity metadata includes at least one of: a record count, a value discrepancy count, a performance latency, and value discrepancies corresponding to a particular record.

In one embodiment, the second component in the production environment is functionally equivalent to, and is intended to replace the first component in the production environment, and where the first result data is sent to a client.

In one embodiment, generation of the discrepancy information is configurable by configuration parameters, where the configuration parameters include a sampling rate for the parity check and a granularity for parity metadata.

In one embodiment, the first component in the production environment is functionally equivalent to, and is intended to replace the second component in the production environment, and where the first result data is sent to a client.

In one embodiment, the parity check is implemented as a proxy for performing the first request at the first component or the second request at the second component.

Note that some or all of the components as shown and described above (e.g., database engine 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In one embodiment, an entity can be a user group, an organization or company, or a unit or department of an organization or company. A task database system can be a customer management system. A task refers to an action performed by an entity. A task represents an opportunity, a project, or a business process. For example, a task can be a process of negotiating an agreement between two entities such as an agreement for one entity (referred to as a target entity) to acquire services or goods from another entity (referred to as a source entity). A task can be performed in a number of task stages representing a progress of the task.

Figure 7:
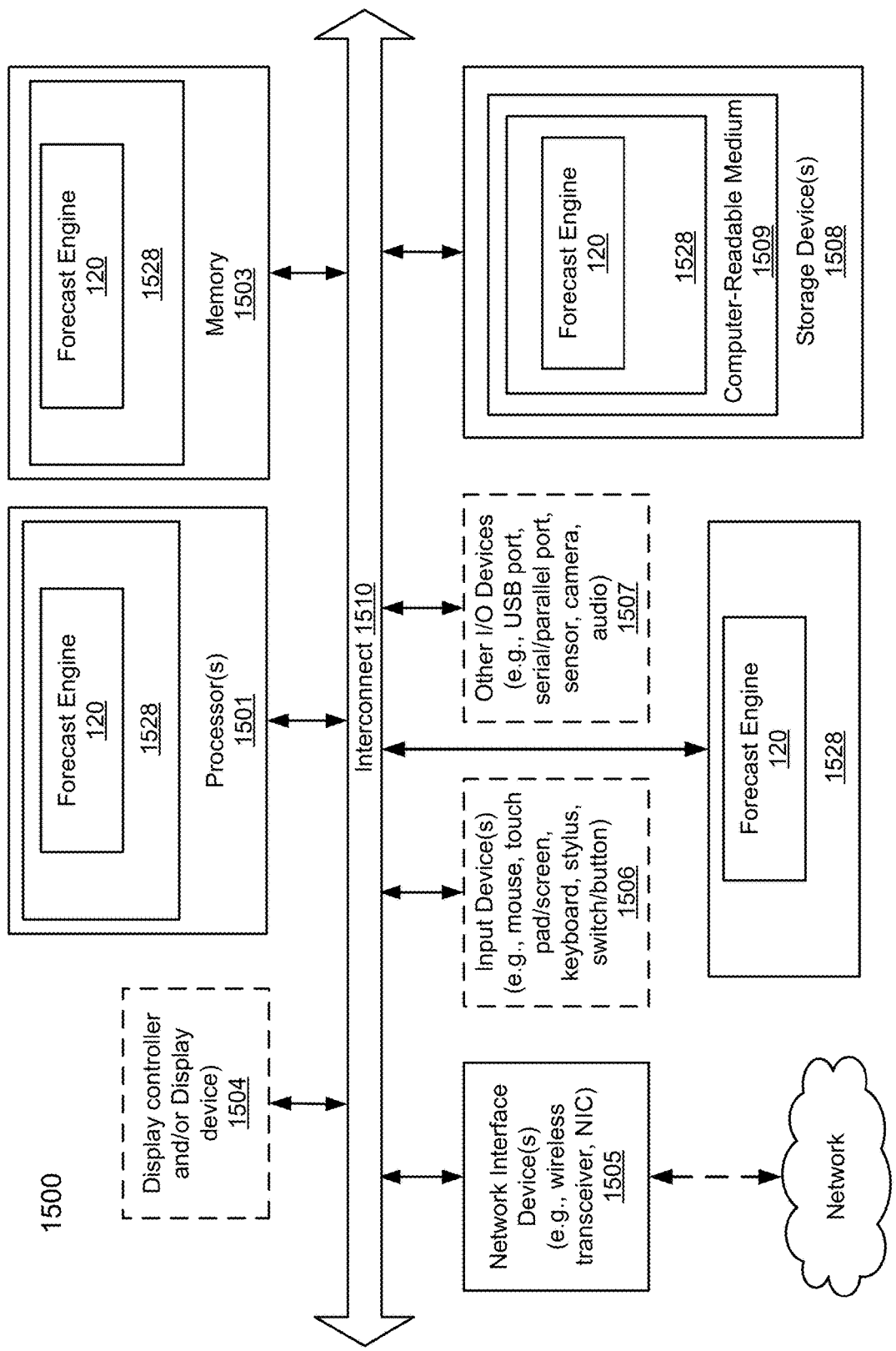
FIG. 7 is a block diagram illustrating a data processing system according to one embodiment.

FIG. 7 is a block diagram illustrating an example of a data processing system which may be used with one embodiment of the invention. For example, system 1500 may represent any of data processing systems described above performing any of the processes or methods described above, such as, for example, client devices 101-102 and server 104 of FIGS. 1A-B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device May provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to validate behavior of a replacement component, the method comprising:
    obtaining first result data, wherein the first result data is generated by performing a first request at a first component of a production environment;
    performing a second request at a second component of the production environment to generate second result data;
    performing a parity check between the first result data and the second result data to determine an equivalence in behavior between the first request at the first component and the second request at the second component;
    generating discrepancy information indicating the equivalence in behavior between the first request at the first component and the second request at the second component based on the parity check; and
    performing a third action based on the discrepancy information including storing the discrepancy information.

2. The method of claim 1, further comprising: before obtaining the first result data, determining a first configuration indicator indicating whether to perform the parity check when a client requests performance of the first request at the production environment.

3. The method of claim 1, wherein performing the first request at the first component comprises performing a first access query request at a first data store and performing the second request at the second component comprises performing a second access query request at a second data store, wherein the first and second result data are a first and a second query result, respectively.

4. The method of claim 3, further comprising:
    determining a second configuration indicator indicating either to access data from the first data store or the second data store; and
    in response to determining that the second configuration indicator indicating data from the second data store is accessed, returning the second result data to a client.

5. The method of claim 1, wherein performing the first request at the first component comprises performing a first write query request to mutate data at a first data store, and wherein performing the second request at the second component comprises performing a second write query request to mutate data at a second data store.

6. The method of claim 5, further comprising:
intercepting the first or the second write query requests;
translating the first write query request to correspond to a second schema, wherein the first data store is of a first schema and the second data store is of the second schema; and
performing the parity check between the translated first write query request and the second write query request to generate the discrepancy information indicating discrepancies between the translated first write query request and the second write query request.

7. The method of claim 6, further comprising:
determining a second configuration indicator indicating either to commit the first write query request to the first data store or to commit the second write query request to the second data store; and
in response to determining that the second configuration indicator indicating the second write query request is to be committed to the second data store, committing the second write query request to the second data store.

8. The method of claim 6, further comprising:
determining a third configuration indicator indicating whether to commit writes to the production environment; and
in response to determining that the third configuration indicator indicating not to commit writes to the production environment, refraining from committing the second write query request to the second data store.

9. The method of claim 1, wherein performing the first request at the first component comprises performing a first http request at a first http address and performing the second request at the second component comprises performing a second http request at a second http address, wherein the first and second result data include http response data.

10. The method of claim 1, further comprising:
determining the discrepancy information satisfies a predetermined criteria, returning the second result data that is generated by the second request to a client, wherein the client requested the first request.

11. The method of claim 1, further comprising:
determining that the discrepancy information satisfy a predetermined criteria, and
replacing the first component by the second component including returning the second result data that is generated by the second request to a client; or
determining that the discrepancy information does not satisfy the predetermined criteria, and
postponing a replacement time of the first component by the second component.

12. The method of claim 1, wherein the equivalence in behavior includes itemized content of the first result data matching itemized content of the second result data.

13. The method of claim 1, wherein the first or second result data includes one or more itemized content and timestamps reflecting execution times of the first or second requests, wherein the parity check ignores an ordering of the itemized content and ignores the timestamps.

14. The method of claim 1, wherein the discrepancy information includes parity metadata for the first and second result data and the parity metadata includes at least one of: a record count, a value discrepancy count, a performance latency, and value discrepancies corresponding to a particular record.

15. The method of claim 1, wherein the second component in the production environment is functionally equivalent to, and is intended to replace the first component in the production environment, and wherein the first result data is sent to a client.

16. The method of claim 1, wherein generation of the discrepancy information is configurable by configuration parameters, wherein the configuration parameters include a sampling rate for the parity check and a granularity for parity metadata.

17. The method of claim 1, wherein the first component in the production environment is functionally equivalent to, and is intended to replace the second component in the production environment, and wherein the first result data is sent to a client.

18. The method of claim 1, wherein the parity check is implemented as a proxy for performing the first request at the first component or the second request at the second component.

19. A non-transitory machine-readable medium having instructions stored therein, which when executed by a processor, causing the processor to perform operations, the operations comprising:
obtaining first result data, wherein the first result data is generated by performing a first request at a first component of a production environment;
performing a second request at a second component of the production environment to generate second result data;
performing a parity check between the first result data and the second result data to determine an equivalence in behavior between the first request at the first component and the second request at the second component;
generating discrepancy information indicating the equivalence in behavior between the first request at the first component and the second request at the second component based on the parity check; and
performing a third action based on the discrepancy information including storing the discrepancy information.

20. A system comprising:
one or more processors; and
a non-transitory storage medium comprising executable instructions, which when executed by the one or more processors, causes the one or more processors to perform operations, the operations comprising:
obtaining first result data, wherein the first result data is generated by performing a first request at a first component of a production environment;
performing a second request at a second component of the production environment to generate second result data;
performing a parity check between the first result data and the second result data to determine an equivalence in behavior between the first request at the first component and the second request at the second component;
generating discrepancy information indicating the equivalence in behavior between the first request at the first component and the second request at the second component based on the parity check; and
performing a third action based on the discrepancy information including storing the discrepancy information.

* * * * *